(12) United States Patent
Gay et al.

(10) Patent No.: US 9,449,722 B2
(45) Date of Patent: Sep. 20, 2016

(54) GRIPPING AND LOCKING/UNLOCKING SYSTEM, AND APPLICATION TO THE HANDLING OF NUCLEAR MATERIALS SPECIMEN HOLDERS

(71) Applicant: COMMISSARIAT A L 'ENERGIE ATOMIQUE ET AUX ENERGIES ALTERNATIVES, Paris (FR)

(72) Inventors: Sebastien Gay, Serres (FR); Niels Peyre, Avignon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 621 days.

(21) Appl. No.: 14/096,792

(22) Filed: Dec. 4, 2013

(65) Prior Publication Data
US 2014/0153686 A1    Jun. 5, 2014

(30) Foreign Application Priority Data

Dec. 4, 2012    (FR) ..................... 12 61578

(51) Int. Cl.
*G21C 19/115*    (2006.01)
*G21F 5/015*    (2006.01)
*G21F 5/14*    (2006.01)

(52) U.S. Cl.
CPC ............ *G21C 19/115* (2013.01); *G21F 5/015* (2013.01); *G21F 5/14* (2013.01)

(58) Field of Classification Search
CPC ........ G21C 19/115; G21F 5/14; G21F 5/015
USPC ........... 376/202, 261, 262; 294/82.19, 82.31, 294/86.4, 86.15, 95, 906
See application file for complete search history.

(56) References Cited

U.S. PATENT DOCUMENTS

| 3,856,621 | A | * | 12/1974 | Suvanto | ............... G21C 19/105 376/262 |
| 3,936,089 | A | * | 2/1976 | Hoffmeister | ......... G21C 19/115 376/262 |
| 4,716,946 | A | | 1/1988 | Grigoletto | ..................... 141/269 |
| 2005/0046213 | A1 | * | 3/2005 | Geddo | ...................... G21F 5/14 294/95 |
| 2008/0265183 | A1 | | 10/2008 | Sirach | ........................ 250/506.1 |
| 2010/0032591 | A1 | | 2/2010 | Lemer | ........................ 250/507.1 |

FOREIGN PATENT DOCUMENTS

| DE | 36 36 016 | 10/1986 |
| FR | 2 906 638 | 4/2008 |
| WO | WO 94/23236 | 10/1994 |

OTHER PUBLICATIONS

Search Report and Written Opinion issued in French Application No. FR 1261578, dated Sep. 23, 2013.

* cited by examiner

*Primary Examiner* — Jack W Keith
*Assistant Examiner* — Daniel Wasil
(74) *Attorney, Agent, or Firm* — Norton Rose Fulbright US LLP

(57) ABSTRACT

A system for gripping an inner tube and locking/unlocking it into and from an outer tube concentric with the inner tube. The system according to the invention is provided with one or more catching devices which allow both sealed locking/unlocking of the inner tube to the gripper member and of the inner tube in the outer tube, achieving this with only a translational movement of the gripper member over a travel A or a travel B. The system according to the invention advantageously constitutes a system for inserting and extracting a specimen holder tube intended to house a specimen of nuclear materials, such as nuclear fuels, into and from a measurement instrumentation holder tube intended to house measurement sensors and a cooling system.

15 Claims, 6 Drawing Sheets

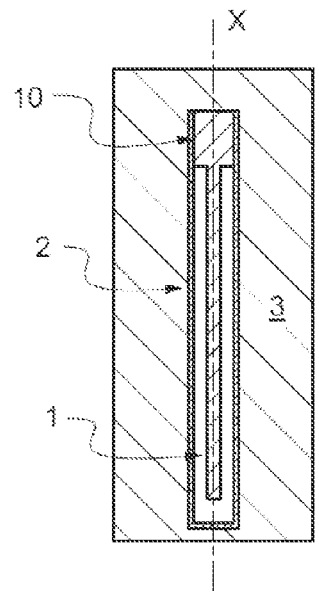
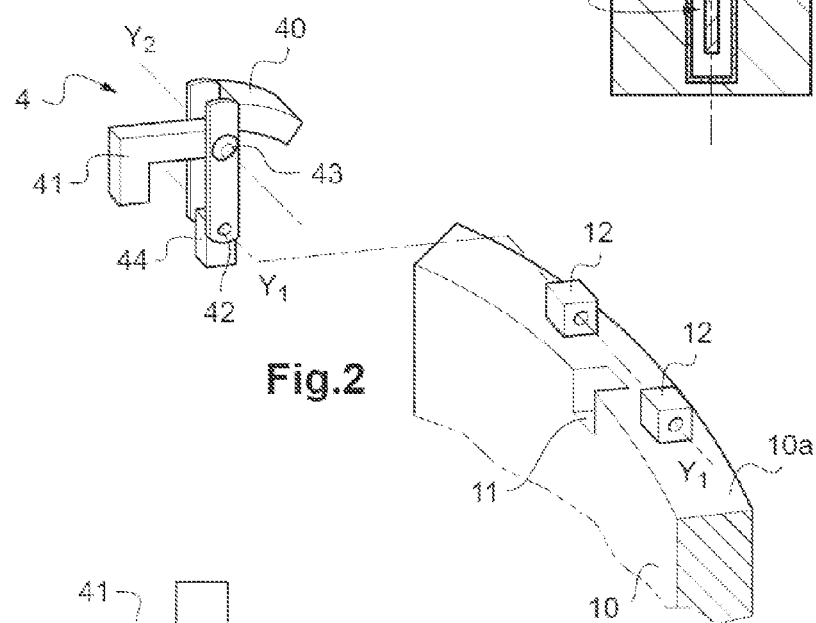
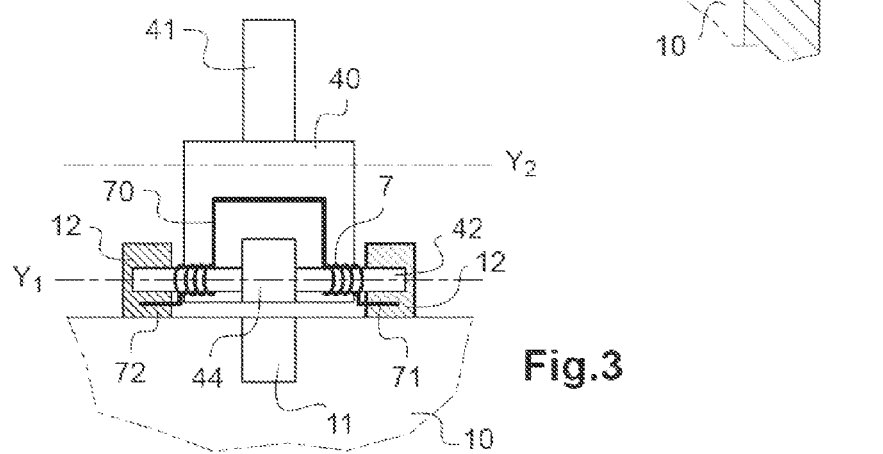

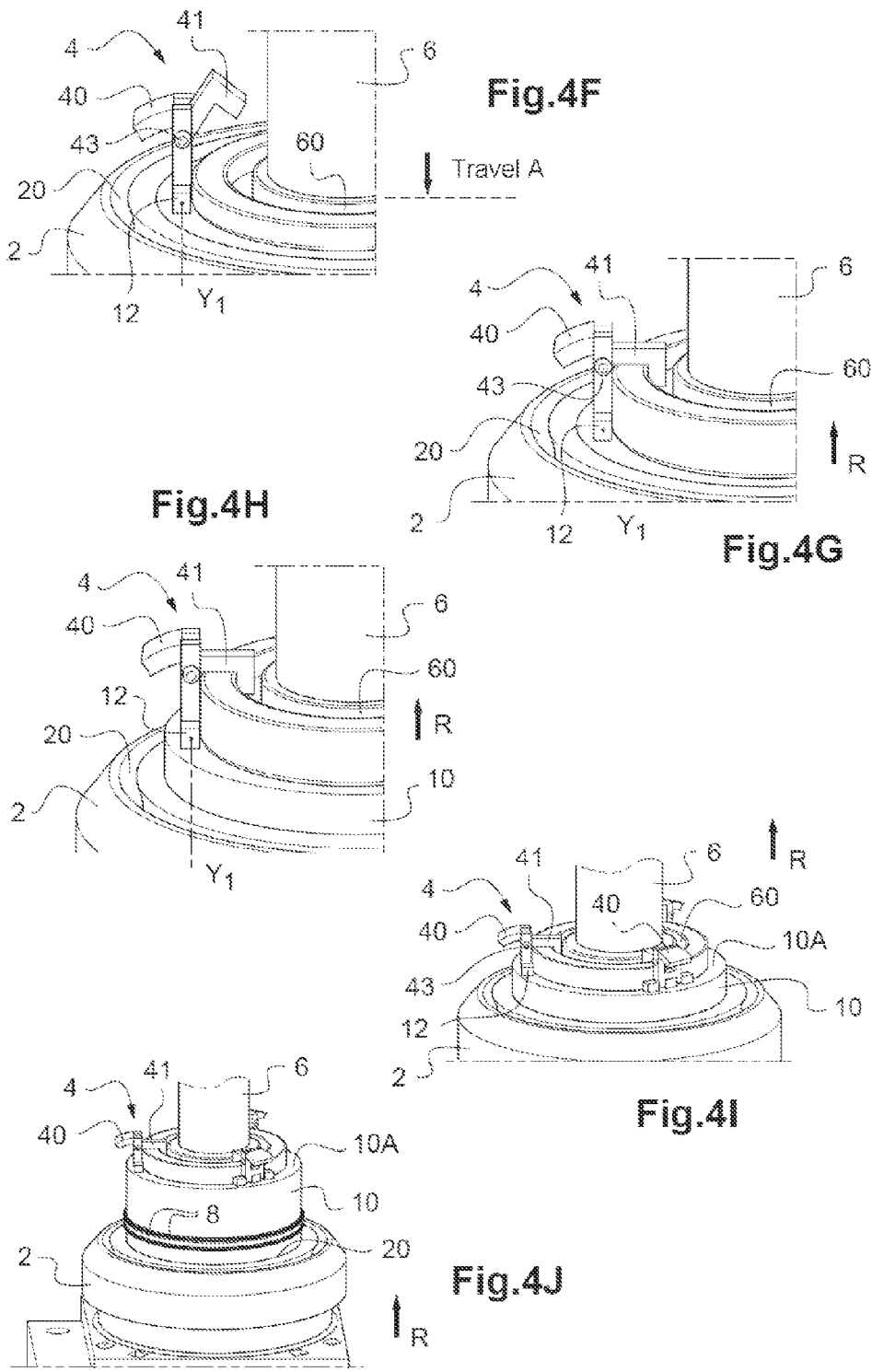

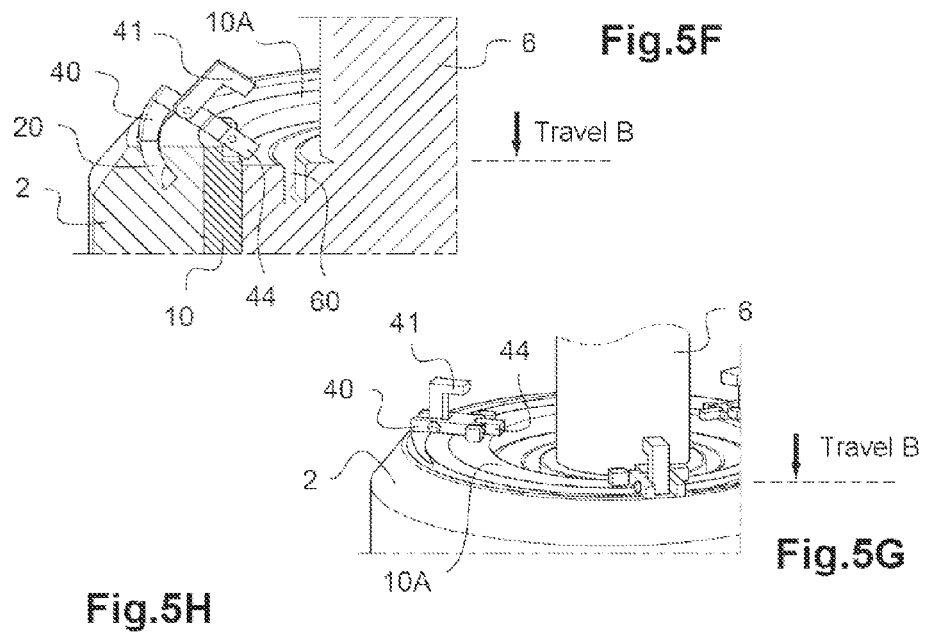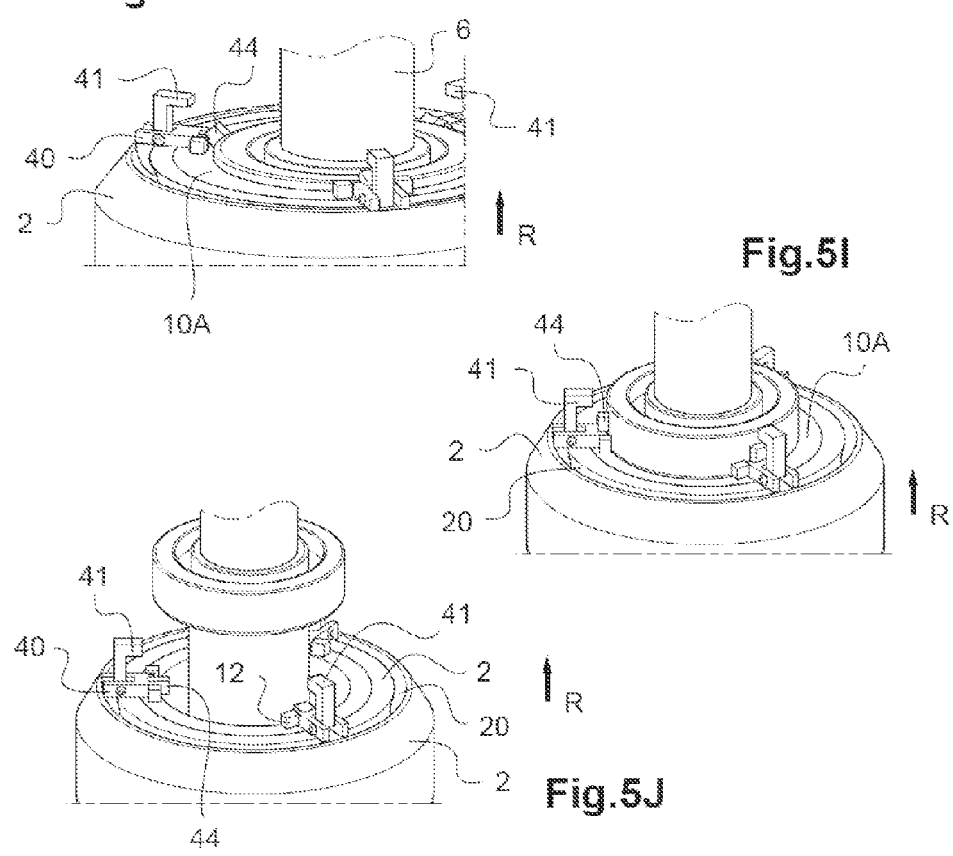

GRIPPING AND LOCKING/UNLOCKING SYSTEM, AND APPLICATION TO THE HANDLING OF NUCLEAR MATERIALS SPECIMEN HOLDERS

CROSS-REFERENCE TO RELATED APPLICATIONS

This application claims priority to French Application No. 12 61578 filed Dec. 4, 2012, the entire contents of which is specifically incorporated herein by reference without disclaimer.

BACKGROUND

1. Field of the Invention

The present invention relates to a novel type of gripping and locking/unlocking system.

The main application targeted by the invention is the handling of nuclear materials specimen holders in a research nuclear reactor, to allow specimen holders to be inserted and extracted without any break in the containment with respect to the external surroundings.

Although it is described hereinafter with reference to the main application, the invention also applies to any application in which it is necessary to insert an inner tube into an outer tube and to lock the two together following insertion and, conversely, to unlock the tubes from one another before extracting the inner tube housed inside the outer tube.

For the sake of conciseness, throughout the present application, a specimen holder tube may be referred to as an "SH tube", and an instrumentation holder tube may be referred to as an "IH tube".

Throughout the present application, the terms "lower", "upper", "vertical", "raising", "lowering", "underneath" and "top" are to be understood as meaning with reference to an outer tube positioned vertically and handling by the gripper member from the top of its upper end. Thus, during a handling operation that allows an inner tube to be inserted into an outer tube, the gripper member is lowered.

2. Prior Art

In order to test how materials and fuels subjected to thermal, neutron or even chemical stresses representative of full-scale operation in an industrial nuclear reactor behave, it is common practice to use research reactors, which are tools that are indispensable in the research and development of nuclear electric reactor systems.

These research nuclear reactors are also commonly known as irradiation reactors because they allow irradiation experiments to be performed on specimens of nuclear materials, such as nuclear fuels, in the pool near or in the reactor core.

In particular, the research reactor that will soon enter service in France, the Jules Horowitz reactor (JHR) will make it possible to study how nuclear fuels behave under various irradiation scenarios.

In order to perform irradiation experiments in irradiation reactors, irradiation devices are designed specifically according notably to the location to be dedicated to them within the core and or nearby in a zone in which an irradiating flux is concentrated.

In the JHR reactor, there is an irradiation device specifically designed for studying nuclear fuels and cladding materials for the fuel rods that house the nuclear fuels.

In order to handle specimens of nuclear materials in research nuclear reactors it is known practice to use by way of specimen holders a tube inside which a specimen, such as a column of nuclear fuel pellets, is housed.

More specifically, a specimen holder tube (SH tube) comprises several tubular portions of different cross section including the widened one of the upper portion, referred to hereinafter as the gripper head, via which the SH tube is gripped so that it can be handled. The specimen that is to be irradiated is itself placed in a portion of the SH tube that is distant from the gripper head, preferably at the opposite end therefrom, especially when the specimen is a column of irradiating fuel pellets. In the installed configuration for irradiation within the core or nearby, the portion of the SH tube in which the specimen is housed needs to be positioned in a zone subjected to the neutron flux, under the conditions required for the irradiation experiment (T°, environment, etc.).

In order to take measurements of the physical parameters associated with the specimens, provision is made for the SH tube to be inserted into a concentric blind tube referred to hereinafter as the instrumentation holder tube (IH tube) in which notably measurement sensors and a cooling system are housed. An IH tube is anchored to part of the irradiation device.

Furthermore, in order to meet safety objectives, it is necessary to ensure sealing between the SH tube which constitutes the inner tube, and the IH tube which constitutes the outer tube so as to form a containment barrier, because the coolant of the cooling system circulating between the IH and SH tubes at a high pressure, typically of at least 160 bar, must not be able to escape into the pool of the irradiation reactor. In other words, in the installed irradiation configuration, it is necessary for the SH tube to be locked and sealed inside the IH tube.

Thus, prior to performing an irradiation experiment, the handling of an SH tube entails gripping it with a gripper member, lowering the gripper member and the SH tube to insert the latter into an IH tube, locking these two, SH and IH, tubes together with sealing, and raising the gripper member on its own.

For the reverse operation, after an irradiation experiment has been performed, the handling of an SH tube housed inside the IH tube entails lowering the gripper member, gripping the SH tube using the gripper member, unlocking the SH tube from the IH tube then raising the gripper member with the SH tube.

Again, in order to meet the safety requirements, the gripping of the SH tube by the gripper member has to be performed with the grip locked.

In the field of the handling of nuclear materials or radioactive substances, it is known practice to use gripper systems (gripper assemblies) with gripper fingers with the grip of the fingers locked and to use hooks to lock/unlock containers or drums containing either nuclear materials or containers which themselves contain radioactive substances. The use of hooks as locking means is often favoured because these constitute a reliable solution that is also simple to produce, and notably involves few mechanical parts.

Mention may be made here of patent application FR 2 725 188 which describes a solution for attaching a lidded drum to a vessel door with inner seal, in order to extract radioactive objects, whereby the locking/unlocking of the lid with respect to the inner seal is performed using hooks that are pivot mounted in the inner seal and the drum is locked/unlocked with respect to the vessel using hooks referred to as bell cranks pivot mounted on the wall of the vessel. One major disadvantage with the solution described is that it in fact requires the fitting of two separate locking/unlocking systems, which increases the number of parts and therefore the risks of seizing. Furthermore, before the actual catching proper, the handling of the drum entails the use of a lift plate positioned underneath. Now, in the main application at which the invention is aimed, it is inconceivable to install any lifting device underneath the SH and IH tubes. Finally, full implementation of the solution described, i.e. for removing both the lid and the inner seal in order to expose the inside of the drum to the volume of the vessel, entails a great many handling operations and therefore a lengthy process time. Now, in the context of a research nuclear reactor, replacing an irradiated specimen with a new specimen without the risk of breaking the containment needs to be a simple and rapid operation so that the number of experiments that can be carried out with one and the same IH tube in a given period of time can be increased.

Patent application FR 2 906 638 for its part describes a container for transporting a receptacle containing a radioactive substance, in which the lid of the container is locked/unlocked with respect to the body of the container using hooks pivot mounted in the lid, it being possible for the pivoting of the hooks to be brought about either by lowering a magnetic grip onto the magnetized lid, or by pivoting a mechanical grip pivot mounted on the lid. The system for gripping hold of the lid either by magnetic means or using the mechanical grip as described in this application is not really conceivable in the context of a nuclear reactor.

There is therefore a need for a system for gripping hold of a specimen holder tube and for the sealed locking/unlocking of a specimen holder tube in an instrumentation holder tube within an irradiation nuclear reactor with the grip locked/unlocked, which is reliable, simple to produce with a limited number of parts, and quick to use.

More generally, there is a need for a system for gripping and locking/unlocking an inner tube in an outer tube concentric with the inner tube, with the grip locked/unlocked, which is notably reliable, simple to produce with a limited number of parts, and quick to use.

SUMMARY OF THE INVENTION

The invention seeks to meet all or some of these needs and in one of its aspects relates to a gripping and locking/unlocking system comprising an outer tube, an inner tube designed to be fitted inside the outer tube, a gripper member with a gripper head designed to be housed in the inner tube, in which system the outer tube and the gripper head each comprise at their periphery at least one groove, and in which system the inner tube comprises at least one catching device connected at its upper end and at least one notch formed in the thickness of the inner tube from its upper end, the catching device comprising:

a first hook, referred to as a locking hook, mounted to pivot about a pivot pin orthogonal to the longitudinal axis of the inner tube between a locked position in which it is housed in the groove of the outer tube to lock the inner and outer tubes together, and an unlocked position in which it is distant from the said groove, a second hook referred to as a gripping hook, mounted to pivot on the first hook about a pivot pin orthogonal to the longitudinal axis of the inner tube, between a gripping position in which it is housed in the groove of the gripper head so as to grip the inner tube and at least one release position in which it is distant from the said groove, an actuating lever mounted on the pivot pin about which the locking hook pivots between a first neutral position in which it is distant from the notch and does not project into the inner tube and a second neutral position in which it is housed in the notch, passing via an actuating position in which it does project into the inner tube, the actuating lever being connected for rotation to the locking hook between its actuating position and its second neutral position, and free to rotate independently of the locking hook between its first and second neutral positions, a first elastic return means for returning the gripping hook from a released position to its gripping position, the system being configured so that:

when the inner tube is fitted inside the outer tube and locked thereto by the locking hook held by the return means, a downwards translational movement of the gripper head in the inner tube over a given travel (A) causes the actuating lever to pivot from its actuating position into its second neutral position and thus simultaneously causes the locking hook to pivot from its locked position to its unlocked position, then causes the gripping hook to pivot both under the effect of its self weight and under the elastic effect of the first return means into the groove of the gripper head, thus unlocking the inner and outer tubes from one another and then causing the inner tube to be gripped by the head, at the end of the travel (A), when the gripper head and the inner tube are locked together by the gripping hook, a downwards translational movement of the gripper head and of the inner tube inside the outer tube over a given travel (B) greater than the travel (A) causes the gripping hook to be released from the groove of the head then causes the actuating lever to disengage from its second neutral position and thus simultaneously causes the locking hook to pivot from its unlocked position into its locked position under the effect at least of its self weight, thus unlocking the inner tube from the gripper head and locking together the inner and outer tubes, at the end of the travel B.

In other words, the invention essentially consists of a system with one or more catching devices allowing both the sealed locking/unlocking of the SH tube to the gripper member before and after the irradiation experiments in the irradiation reactor, and of the SH tube in the IH tube for carrying out these experiments, and doing so only with a translational movement of the gripper member over the travel A or the travel B.

Such a system according to the invention is particularly advantageous because it is simple to produce, reliable and quick to use.

In the configuration in which the SH tube is installed inside the IH tube with the gripper member at a distance, the sealed locking of the SH tube in the IH tube performed using the system according to the invention is robust and allows the coolant of the cooling system between the SH and IH tubes to be placed under a relatively high pressure, typically of at least 160 bar.

Furthermore, it allows reliable handling of the specimens of material blind, namely in a configuration in which it is impossible visually or using any other technological means such as a camera, to check whether or not the elements are in the locked state. Indeed all that is required is a check on whether or not the gripper member has covered its travel (A, B) towards and into the SH tube.

The system according to the invention can be used for any application in which it is necessary to grip and to lock/unlock an inner tube that is to be housed inside an outer tube.

According to one advantageous variant, the system comprises a plurality of catching devices connected to the upper end of the inner tube, the catching devices being distributed about the periphery of the inner tube in order to provide a statically determinate distribution of locking and gripping loads. For preference, according to this variant, the system comprises three catching devices arranged 120° apart about the longitudinal axis of the inner tube. This then further reinforces the reliability of the system by distributing the mechanical loads in this way.

According to an advantageous variant, the first elastic return means consists of a torsion coil spring mounted around the pivot pin about which the gripping hook pivots, with its two end turns fixed, and a pressing central turn configured to press against the gripping hook. Such a variant is advantageous because the torsion spring is easy to produce, to size and to fit in the catching device.

According to an advantageous embodiment, the system comprises a second elastic return means for returning the locking hook from its unlocked position to its locked position. Such an embodiment is advantageous because it allows the locking hook to be returned more swiftly than under the effect of its self weight alone. For preference, the second elastic return means consists of a coil torsion spring mounted around the pivot pin about which the locking hook pivots, the spring comprising two end turns connected to the upper end of the inner tube and a central pressing turn configured to press against the locking hook.

For preference, the locking hook consists of a finger of a shape complementing the groove of the outer tube, and of a substantially V-shaped yoke connected to the finger and inside which the gripping hook is mounted.

According to a first variant, the groove of the outer tube extends around the entire periphery thereof.

Alternatively, according to a second variant, there may be provided at least one groove of the outer tube extending over part thereof.

According to a variant, the groove of the gripper head extends over the entire periphery thereof.

The actuating lever advantageously consists of a lug which is simple to produce.

According to one advantageous embodiment, when it is desirable to obtain sealed locking, notably so that the space between the inner and outer tubes can be pressurized, the inner tube and/or the outer tube may advantageously comprise one or more seals in order to create a sealed assembly with one another. These may be o ring seals housed in grooves around the entire periphery of one and/or other of the tubes.

The gripper member and the catching device(s) are dimensioned to overcome the friction forces of the seal(s) as the inner tube is introduced into or extracted from the outer tube. Typically, for the SH and IH tubes envisaged for use in the JHR irradiation reactor, with the coolant of the cooling system pressurized to a pressure of 175 bar, the gripper member and the catching device(s) need to be dimensioned to overcome seal friction forces of the order of 1370N.

The inner tube may constitute a material specimen holder tube and the outer tube may constitute a measurement instrumentation holder.

For the main application at which the invention is aimed, the system constitutes a system for inserting and extracting a specimen holder tube intended to house a specimen of nuclear materials, such as nuclear fuels, into and from a measurement instrumentation holder tube intended to house measurement sensors and a cooling system.

BRIEF DESCRIPTION OF THE DRAWINGS

Further advantages and features of the invention will become better apparent from the following figures in which:

FIG. 1 is a schematic view in the installed-for-irradiation configuration of a specimen holder (SH) tube in an instrumentation holder (IH) tube in a research nuclear reactor;

FIG. 2 is a partially exploded schematic view of a catching device connected to an inner tube according to the invention;

FIG. 3 is a schematic view from the inside of the inner tube showing detail of the catching device according to the invention with the optional return means for returning its locking hook;

FIGS. 4A to 4J are views in perspective and in cross section showing the various stages of the gripping of the inner tube by the gripper member at the same time as the inner and outer tubes are unlocked from one another according to the invention;

FIGS. 5A to 5J are views in perspective and in cross section showing the various stages in the release of the inner tube from the gripper member at the same time as the inner and outer tubes are locked together according to the invention;

DETAILED DESCRIPTION

Figure 4A:
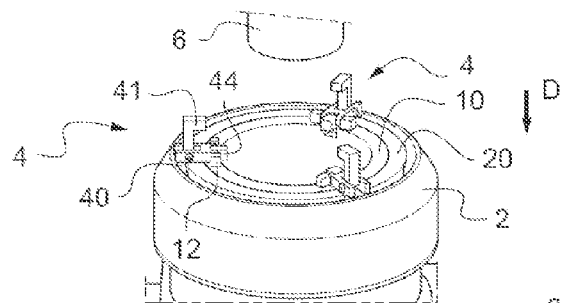

Further advantages and features of the invention will become better apparent from reading the detailed description of some exemplary embodiments of the invention given by way of illustrative and nonlimiting example with reference to the figures.

FIG. 1 depicts an inner tube 1, 10 of longitudinal axis X, constituting a specimen holder tube intended to house a specimen of nuclear materials, such as nuclear fuels, such that it needs to be locked into an outer tube 2 constituting a measurement instrumentation holder intended to house measurement sensors and a cooling system, for the purposes of carrying out irradiation experiments in a water-filled pool 3 of a nuclear research reactor. More specifically, the inner tube 1 comprises a tubular lower portion in which a specimen of nuclear materials, such as a column of nuclear fuel pellets, is housed, and a tubular upper portion 10 via which a gripper member 6 grips it.

Prior to any irradiation experiment, the inner tube 1 needs to be able to be brought in, inserted inside the outer tube 2 by the lowering of a gripper member, then locked to the outer tube 2, the gripper member having to be released from the inner tube 1 so that it can be raised back again.

After one or more irradiation experiments, the inner tube 1 needs to be able to be unlocked from inside the outer tube 2 in which it is housed, the gripper member needs to be able to take hold of the unlocked inner tube 1 and be raised back up again with the latter in order to extract it from the pool 3.

According to the invention, a system with at least one catching device 4 is designed firstly to release the inner tube 1 from the gripper member 6 and, in the same movement of the gripper member 6, to lock the inner tube 1 with sealing to the outer tube 2 and, secondly, to unlock the inner tube 1 housed in the outer tube 2 and, in the same movement of the gripper member 6, to allow the gripper member 6 to grip the inner tube 1.

According to the invention, the outer tube 2 and the gripper member 6 each comprise a respective groove 20, 60. The inner tube 1, 10 comprises at least one notch 11 at its upper end 10a. The gripper head of the gripper member 6 has an outside diameter tailored to the inside diameter of the inner tube 1.

A catching device 4 according to the invention is connected to the upper end 10a of the inner tube 10. The catching device consists of a double hook 40, 41 of which one hook, 40, is pivot mounted about a pivot pin 42, Y1 orthogonal to the longitudinal axis X of the inner tube. As shown in FIGS. 2 and 3, this pivot pin 42 can be mounted in two lugs 12 distant from one another, and themselves fixed to the upper end 10a of the inner tube 1, 10. The two lugs can be produced as one piece with the inner tube 1, 10.

Figure 6:
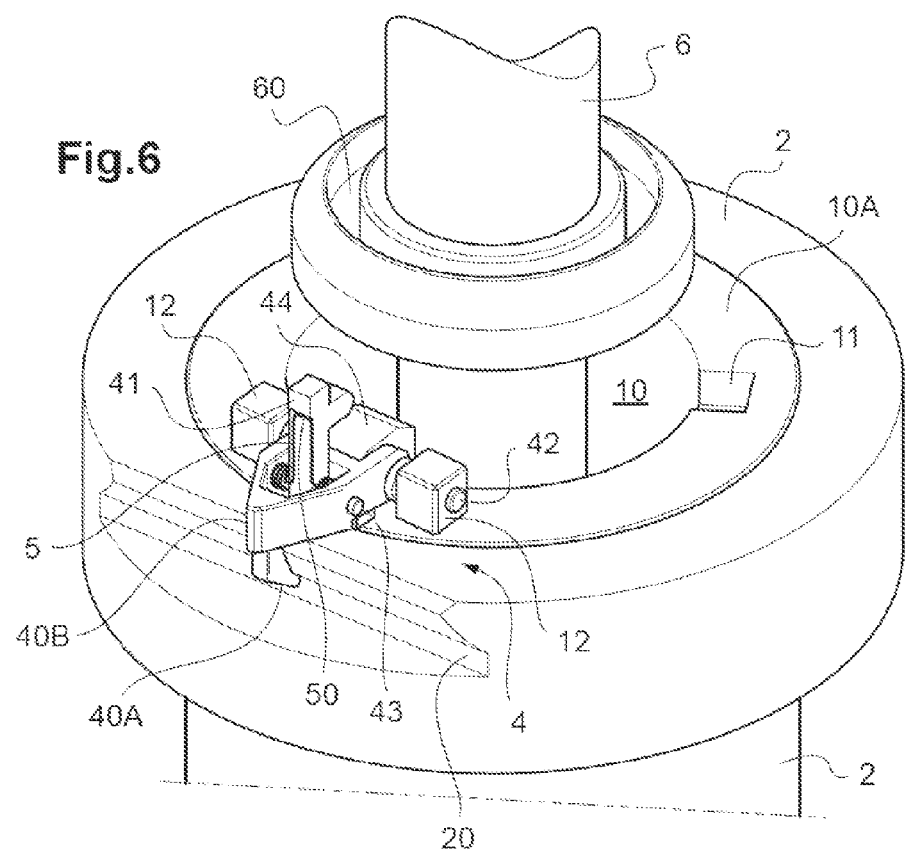
FIG. 6 is a schematic and perspective view showing the inner and outer tubes locked together according to the invention, with the gripper member nearby.
Figure 7:
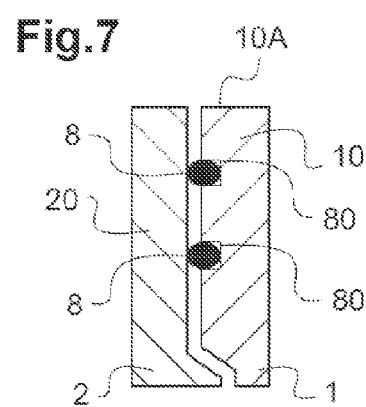
FIG. 7 is a view in cross section showing detail of the sealing achieved between the inner and outer tubes locked together.

More specifically, the catching device 4 comprises first of all a locking hook 40 pivot mounted about the pivot pin 42, Y1 orthogonal to the longitudinal axis X of the inner tube, between a locked position in which it is housed in the groove 20 of the outer tube 2 to lock the latter to the inner tube 1, and an unlocked position in which it is distant from the said grove 20. As depicted in FIG. 6, the locking hook 40 may consist of a finger 40a of a shape complementing the groove 20 of the outer tube 2, and of a substantially V-shaped yoke 40b connected to the finger 40a.

The catching device 4 also comprises a gripping hook 41 pivot mounted on the locking hook about a pivot pin 43, Y2 likewise orthogonal to the longitudinal axis X of the inner tube 1, so it pivots between a gripping position in which it is housed in the groove 60 of the gripper head 6 in order to grip the inner tube and at least one release position in which it is distant from the said groove 60. As depicted in FIG. 6, the gripping hook 41 can be mounted inside the yoke 40b of the locking hook 40.

The catching device 4 also comprises an actuating lever 44 mounted on the axis Y1 of the locking hook 40. The actuating lever 44 pivots between a first neutral position in which it is distant from the notch and does not project into the inner tube 1 and a second neutral position in which it is housed in the notch 11, passing via an actuating position in which it does project into the inner tube 1. The actuating lever 44 is connected in terms of rotation to the locking hook 40 between its actuating position and its second neutral position. Further, the actuating lever 44 is free to rotate independently of the locking hook 40 between its first and second neutral positions, as explained hereinafter with reference to FIGS. 4A to 4I. As illustrated in all the figures, the actuating lever may consist of a simple lug 44 in the continuation of the locking hook 40.

The gripping and locking/unlocking system according to the invention finally comprises an elastic return means 5 for returning the gripping hook 41 from a release position to its gripping position. As illustrated in FIG. 6, the elastic return means may advantageously consist of a coil torsion spring 5 mounted about the pivot pin 43, Y2 about which the gripping hook 41 pivots, with its two end turns fixed and a pressing central turn 50 configured to press against the gripping hook 41.

The system according to the invention may further comprise an additional elastic return means 7 for returning the locking hook 40 from its unlocked position to its locked position. As illustrated in FIG. 8, this additional elastic return means 7 may advantageously consist of a coil torsion spring 7 mounted around the pivot pin 42, Y1 about which the locking hook 40 pivots, with its two end turns 51, 52 fixed and a central pressing turn 70 configured to press against the locking hook 40.

In the embodiment illustrated in FIGS. 4A to 5J, the system according to the invention has three catching devices 4 like the one described, arranged 120° apart about the longitudinal axis (X) of the inner tube. Such an embodiment is advantageous because it allows a statically determinate distribution of the gripping and locking loads. In this same embodiment, the grooves 20, 60 of the outer tube 2 and of the gripper member 6 respectively are each made around the entire periphery of this tube and of this member.

In the embodiment illustrated in FIG. 6, the system according to the invention has just one catching device 4 as has just been described. In this same embodiment, provision is made for the groove 20 to be produced over just a peripheral portion of the outer tube 2.

It is specified here that the arrows D indicate a downward movement of the gripper member 6 whereas the arrows R indicate a rising movement of the gripper member 6.

It is also specified that the travel A denotes the travel achieved by the gripper member 6 at the end of its downward movement when gripping the inner tube 1 locked to the outer tube 2 (FIGS. 4A to 4J).

The travel B itself denotes the travel achieved by the gripper member 6 at the end of its downward movement when releasing the inner tube 1 and locking it to the outer tube 2 (FIGS. 5A to 5J).

The kinematics of the gripping of the inner tube 1 by the gripper member 6 and, in the same movement of the gripper member 6, the unlocking of the inner 1 and outer 2 tubes from one another that the configuration of the system according to the invention allows is now described.

Figure 4B:
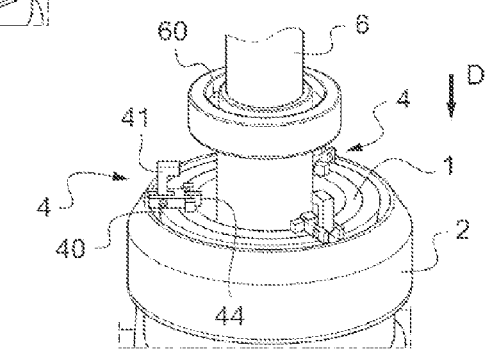

When the inner 1 and outer 2 tubes are locked together by the locking hook 40 and there is a desire to extract the inner tube 1, the gripper member is lowered (FIGS. 4A and 4B).

Figure 4C:
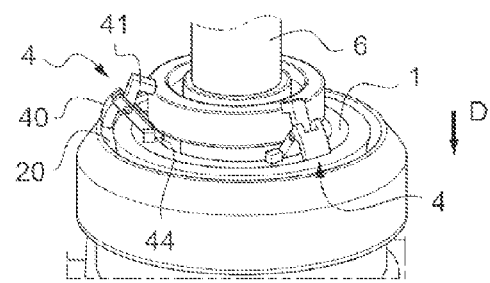
Figure 4D:
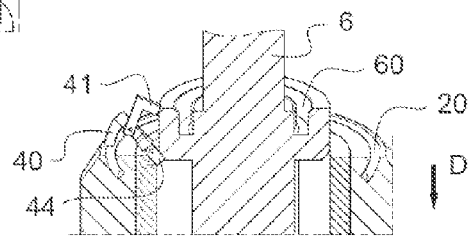

In its downward movement, as the gripper member 6 comes into abutment with the actuating lever 44, the latter pivots and the locking hook 40, connected for rotation to the lever 44, pivots at the same time about the axis Y1 towards the inside of the tubes 1, 2 from its locked position to its unlocked position (FIGS. 4C-4D). Because of its contact with the outer surface of the gripper head, the gripping hook 41 pivots through an angle of a few degrees towards the outside of the tubes.

Figure 4E:
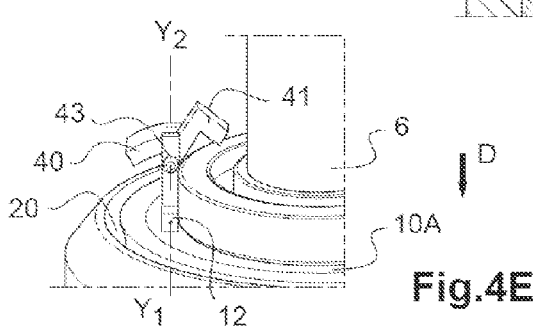

The downward movement of the gripper member 6 is continued, and this causes the actuating lever 44 to become lodged in its neutral position in the notch 11 and at the same time causes the locking hook 40 to be completely released from the groove 20 of the outer tube 2, namely to move into an unlocked position (FIG. 4E). The unlocking of the inner tube 1 from the outer tube has actually been achieved. In this position, the gripping hook 41 begins to pivot towards the groove 60 of the gripper member 6 under the effect of its self weight and of the torsion spring 5 which returns the said hook 41 towards the inside of the tubes 1, 2.

The lowering of the gripper member is then stopped at the end of the travel A, the gripping hook 41 continuing to pivot towards the inside of the tube 1 towards its gripping position (FIG. 4F).

The raising of the gripper member 6 can then be commenced, the pivoting of the gripping hook 41 continuing until it has entered the groove 60 of the gripper member 6, namely until it has reached its gripping position (FIG. 4G). The gripping and the locking of the inner tube 1 to the gripper member 6 are then actually achieved, and the inner tube 1 has also been unlocked from the outer tube 2. Thus, as the inner tube is grasped, the operator is assured that there will be no risk of damage to the gripping system, to the inner tube itself or to the connection between the two. This aspect is of particular importance when the operations are performed blind, for example to a slab or an opaque head, as will be the case in the JHR irradiation reactor. Full control over the two travels A and B, for example by incorporating them into an automated system, will make it possible to ensure that these operations are completed safely.

The raising of the gripper member 6 is then continued (FIGS. 4H to 4J). The gripper member and the catching device(s) 4 are dimensioned to overcome the friction forces of the seal(s) 8 housed inside grooves 80 at the periphery of the inner tube 1 as the latter is being extracted from the outer tube 2 (FIG. 4J).

The kinematics of the sealed locking of the inner tube 1 in the outer tube 2 and, in the same movement of the gripper member 6, the release of the inner tube 1 from this member that the configuration of the system according to the invention allows, is now described.

Figure 5A:
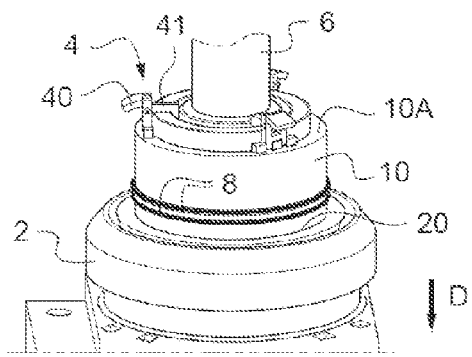
Figure 5B:
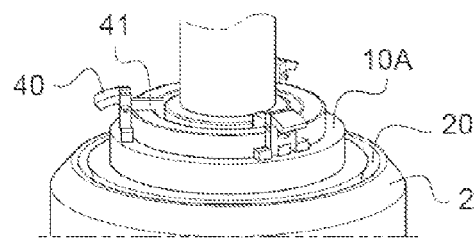
Figure 5C:
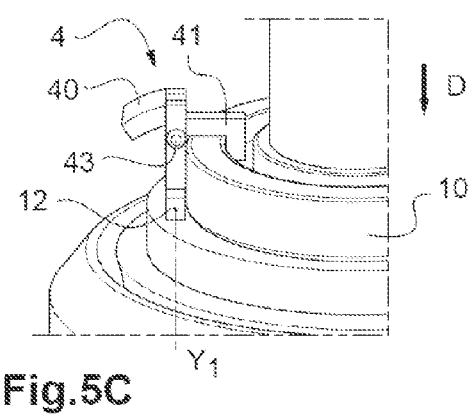

When the inner tube 1 has been grasped by the gripper member and locked thereto using the gripping hook 41 in its gripping position and there is a desire to lock the inner tube 1 to the outer tube 2, the gripper member 6 is lowered (FIGS. 5A and 5B). The gripper member 6 and the catching device(s) 4 are dimensioned to overcome the friction forces of the seal(s) 8 housed inside the grooves 80 at the periphery of the inner tube 1 as the latter is introduced into the outer tube 2 (FIG. 5A).

Figure 5D:
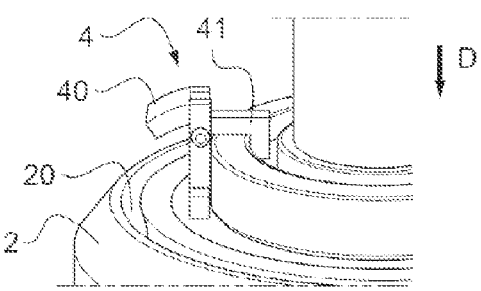

Once the insertion of the inner tube 1 into the outer tube 2 has begun, the lowering of the gripper member 6 is continued (FIG. 5C) until the inner tube 1 comes into abutment at the bottom (FIG. 5D). In this position, the upper end 10a of the inner tube 1 is level with that of the outer tube 2.

Figure 5E:
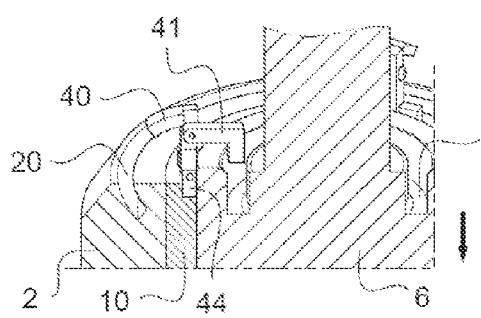

The lowering of the gripper member is continued and this causes the gripping hook 41 to be released from the groove 60 of the gripper member 6 (FIG. 5E).

The lowering of the gripper member 6 is continued until the travel B which is greater than the travel A is achieved (FIG. 5F). In this position, the actuating lever 44 is no longer held in its neutral position in the notch 11 by the release member 6.

The locking hook 40 then pivots about the axis Y1 under the effect of its self weight and of the torsion spring 7 towards the outside of the tubes 1, 2 and this simultaneously causes the actuating lever 44 connected for rotation to the locking hook 40 to pivot and also causes the gripping hook 41 to pivot into its release position maintained by the torsion spring 5. The pivoting of the locking hook 40 continues until this hook has reached its locked position (FIG. 5G). In this position, the actual locking together of the inner 1 and outer 2 tubes has actually been achieved by the locking hook 40.

The gripper member 6 is then raised, causing the actuating lever 44 to pivot upwards from its actuating position (FIG. 5G) to its neutral position (FIG. 5H) in which it does not project inside the inner tube 1 (FIG. 5I).

The raising of the gripper member 6 can then continue, with the actuating lever 44 pivoting downwards under its self weight until it returns to its initial actuating position (FIG. 5J).

The invention is not limited to the examples that have just been described; features of the examples illustrated can notably be combined with one another in variants that have not been illustrated.

Thus, for example, the illustrated L-shape of the gripping hook 41 can be altered, as can that of the locking hook 40 and of the actuating lug 44.

Moreover, the number of catching devices 4 may be increased, notably in order to be able to overcome higher seal 8 sealing forces.

The invention claimed is:

1. Gripping and locking/unlocking system comprising:
an outer tube comprising at its periphery at least one groove;
an inner tube designed to be fitted inside the outer tube, the inner tube comprising at least one catching device connected at its upper end and at least one notch formed in the thickness of the inner tube from its upper end;
a gripper member with a gripper head designed to be housed in the inner tube, the gripper head comprising at its periphery at least one groove,
wherein the at least one catching device comprises:
a first hook, referred to as a locking hook, mounted to pivot about a pivot pin orthogonal to the longitudinal axis of the inner tube between a locked position in which it is housed in the groove of the outer tube to lock the inner and outer tubes together, and an unlocked position in which it is distant from the said groove of the outer tube;
a second hook referred to as a gripping hook, mounted to pivot on the first hook about a pivot pin orthogonal to the longitudinal axis of the inner tube, between a gripping position in which it is housed in the groove of the gripper head so as to grip the inner tube by the gripper head and at least one release position in which it is distant from the said groove of the gripper head;
an actuating lever mounted on the pivot pin about which the locking hook pivots between a first neutral position in which it is distant from the at least one notch and does not project into the inner tube and a second neutral position in which it is housed in the at least one notch, passing via an actuating position in which it does project into the inner tube, the actuating lever being connected to rotate with the locking hook between its actuating position and its second neutral position, and free to rotate independently of the locking hook between its first and second neutral positions;
a first elastic return means for returning the gripping hook from a released position to its gripping position;
wherein the system is configured so that:
when the inner tube is fitted inside the outer tube and locked thereto by the locking hook, a downwards translational movement of the gripper head in the inner tube over a given travel (A) causes the actuating lever to pivot from its actuating position into its second neutral position and thus simultaneously causes the locking hook to pivot from its locked position to its unlocked position, then causes the gripping hook to pivot both under the effect of its self-weight and under the elastic effect of the first elastic return means into the groove of the gripper head, thus unlocking the inner and outer tubes from one another and then causing the inner tube to be gripped by the head, at the end of the travel (A);
when the gripper head and the inner tube are locked together by the gripping hook, a downwards translational movement of the gripper head and of the inner tube inside the outer tube over a given travel (B) greater than the travel (A) causes the gripping hook to be released from the groove of the head then causes the actuating lever to disengage from its second neutral position and thus simultaneously causes the locking hook to pivot from its unlocked position into its locked position under the effect at least of its self-weight, thus unlocking the inner tube from the gripper head and locking together the inner and outer tubes, at the end of the travel B.

2. The gripping and locking/unlocking system according to claim 1, comprising a plurality of catching devices connected to the upper end of the inner tube, the catching devices being distributed about the periphery of the inner tube in order to provide a statically determinate distribution of locking and gripping loads.

3. The gripping and locking/unlocking system according to claim 2, comprising three catching devices arranged 120° apart about the longitudinal axis (X) of the inner tube.

4. The gripping and locking/unlocking system according to claim 1, the first elastic return means consisting of a torsion coil spring mounted around the pivot pin about which the gripping hook pivots, with its two end turns fixed and a pressing central turn configured to press against the gripping hook.

5. The gripping and locking/unlocking system according to claim 1, comprising a second elastic return means for returning the locking hook from its unlocked position to its locked position.

6. The gripping and locking/unlocking system according to claim 5, the second elastic return means consisting of a coil torsion spring mounted around the pivot pin about which the locking hook pivots, with its two end turns fixed and a central pressing turn configured to press against the locking hook.

7. The gripping and locking/unlocking system according to claim 1, the locking hook consisting of a finger of a shape complementing the groove of the outer tube, and of a substantially V-shaped yoke connected to the finger and inside which the gripping hook is mounted.

8. The gripping and locking/unlocking system according to claim 1, in which the groove of the outer tube extends around the entire periphery thereof.

9. The gripping and locking/unlocking system according to claim 1, comprising at least one groove of the outer tube extending over only a part thereof.

10. The gripping and locking/unlocking system according to claim 1, in which the groove of the gripper head extends over the entire periphery thereof.

11. The gripping and locking/unlocking system according to claim 1, the actuating lever consisting of a lug.

12. The gripping and locking/unlocking system according to claim 1, the inner tube and/or the outer tube comprising one or more seals in order to create a sealed assembly with one another.

13. The gripping and locking/unlocking system according to claim 12, the gripper member and/or the catching device(s) being dimensioned to overcome the friction forces of the seal(s) as the inner tube is introduced into or extracted from the outer tube.

14. The gripping and locking/unlocking system according to claim 1, the inner tube constituting a material specimen holder tube, the outer tube constituting a measurement instrumentation holder tube.

15. The gripping and locking/unlocking system according to claim 14, constituting a system for inserting and extracting a specimen holder tube intended to house a specimen of nuclear materials, into and from a measurement instrumentation holder tube intended to house measurement sensors and a cooling system.

* * * * *